(No Model.) 6 Sheets—Sheet 1.
S. C. MAINS.
COMBINED CORN PLANTER AND CHECK ROWER.
No. 438,440. Patented Oct. 14, 1890.

(No Model.) 6 Sheets—Sheet 5.

S. C. MAINS.
COMBINED CORN PLANTER AND CHECK ROWER.

No. 438,440. Patented Oct. 14, 1890.

WITNESSES: INVENTOR:

(No Model.) 6 Sheets—Sheet 6.

S. C. MAINS.
COMBINED CORN PLANTER AND CHECK ROWER.

No. 438,440. Patented Oct. 14, 1890.

WITNESSES: F. L. Ourand, Arthur L. Morsell

INVENTOR: Samuel C. Mains, by Saus Dagger Co., Attorney

UNITED STATES PATENT OFFICE.

SAMUEL C. MAINS, OF GLENDON, IOWA.

COMBINED CORN-PLANTER AND CHECK-ROWER.

SPECIFICATION forming part of Letters Patent No. 438,440, dated October 14, 1890.

Application filed May 2, 1890. Serial No. 350,322. (No model.)

*To all whom it may concern:*

Be it known that I, SAMUEL C. MAINS, a citizen of the United States, and a resident of Glendon, in the county of Guthrie and State of Iowa, have invented certain new and useful Improvements in Combined Corn-Planters and Check-Rowers; and I do hereby declare that the following is a full, clear, and exact description of the invention, which will enable others skilled in the art to which it appertains to make and use the same, reference being had to the accompanying drawings, which form a part of this specification.

My invention has relation to improvements in combined corn-planters and check-rowers.

The object is to produce a combined corn-planter and check-rower of such a type that the checking may be accomplished without the necessity of knotted wires, as ordinarily employed; further, in so arranging the checking mechanism that it may be employed in connection with almost any form of corn-planter; further, in providing for the adjustment of the several parts with nicety and precision, so that when the checking mechanism is applied to a machine not specially built for the same the several parts may be made to perform their functions with facility and accuracy. Still further objects will appear in the description which follows.

With the above in view the invention consists in the improved construction and combination of parts, as hereinafter more fully described and set forth.

In the accompanying drawings, Fig. 6 is a transverse section on the line $zz$, same figure. Fig. 7 is a detail perspective view. Fig. 11 is a plan view of the plate formed upon the upper end of said chute. Fig. 11$^a$ is a detail view in perspective of the under side of said plate. Fig. 17 is a detail view of one of the bifurcated brackets by means of which the two frames are pivotally connected.

Like letters of reference refer to like parts throughout the several views.

Referring to the drawings, the letter A indicates the rear frame of the device, and B the front frame. The rear frame A consists of longitudinal side strips $a\,a$ and the forward and rear cross-strips $a'\,a'$.

The letter D indicates the rear axle, provided with the usual drive-wheels E E. Two plates F F' are secured to this axle, plate F being provided with a forwardly-extending integral flange $f$, and plate F' having formed integral therewith a segmental rack-bar $f^2$. To the rear sides of these plates are secured the seat-standards G G, which, being of the ordinary and well-known form, require no specific description.

The letter H indicates a foot lever or treadle, provided at or near its center with teeth or cogs $h$ and having its forward end bifurcated. This foot treadle or lever is disposed between the plates F F' pivotally by means of a transverse pin or bolt I. Upon this bolt and intermediate the inner side of the lever and segment-rack $f^2$ turns the lower end of a bar or lever J, which carries a double spring-actuated-pawl mechanism, one of the pawls or dogs K adapted to engage the segmental rack-bar and the other dog or pawl K' the cogs of lever H.

The front frame B of the machine consists of the side pieces $b\,b$ and front and rear pieces $b'\,b'$ and central longitudinal piece $b^2$. The latter has projecting from its rear end a slotted clevis L, which passes between the arms of the bifurcated front portion of the treadle H, and is pivoted thereto by means of a transverse pin M. The rear strip $b'$ of this portion of the frame is also provided with bifurcated brackets N N, in which are pivotally secured the forward ends of the longitudinal side strips $a$ $a$ of the rear frame. These brackets are also provided, it will be noticed, with forwardly-extending flanges $n$ $n$, which bear upon the top of the rear strip $b'$. To one of the side pieces $a$ of the rear frame is also secured a segmental rack-bar O, adapted to be engaged by a spring-actuated pawl P, said pawl having secured thereto the rear end of a forwardly-extending rod Q, the forward end of said rod being secured to the tongue or thill R of the vehicle. It is obvious that by operating this pawl the height of the tongue may be conveniently regulated.

Pivotally secured to the front cross-strip $a'$ of the rear frame are the lower ends of arms S S', arm S being straight and terminating at its upper end in a segment $s$, provided with a suitable notch $s'$ and having the front portion of its rounded surface squared off, as indicated at $s^2$. The arm S' is bent so as to form two oblique members with a central straight portion, forming an approximately U shape, said straight portion being secured to arm S.

Between the upper ends of arms S and S' is pivoted upon a transverse bolt T a frame U, said frame consisting of two arms suitably connected together at their rear and having their front ends unconnected and provided with notches $u$ $u$. This frame carries a suitable spring-actuated pawl or dog $T^3$, which is adapted upon the extreme rear throw of the frame to engage the notch of the segment $s$, and upon its extreme forward throw to engage the squared portion $s^2$ of the segment, said squared portion acting as a stop or seat for the pawl.

The letter W indicates the front axle of the vehicle, having mounted upon opposite ends wheels X X. The spokes of these wheels, it will be noticed, are preferably formed in two parts. The inner parts $y$ extend from the hubs and are of tubular form with interior threads, which receive the male threads upon the lower ends of the outer sections $y'$ of the spokes. In this manner the spokes are readily adjusted so as to be made either longer or shorter.

I have shown in the drawings the wheels provided with four double or two-part spokes, the shorter parts connecting with the inner ends of the longer ones, which latter are somewhat extended and provided upon their ends with marking-points Z. By thus providing the wheels with four doubled spokes, arranged in the manner shown and described, the wheel is firmly braced and rendered exceedingly strong. It will also be seen that the peripheries of the wheels are formed in four partly-circular sections A' each section having one end provided with an elongated slot $a^2$. A set-screw B' passes through this slot, through the end of the adjacent section, and, finally, into the appropriate spoke of the wheel. It will be seen that by this construction provision is made for the adjustment of the wheels so that the circumference may be varied to suit different machines. The several sections forming the periphery are also provided with projecting teeth or points $a^3$, which enter the ground when the wheels are lowered and offer a firm footing or bearing for said wheels.

To the front piece $b'$ of the forward frame are secured two standards C' C', provided with circular transversely-apertured heads, through which a transverse rod D' passes. This rod has secured upon opposite ends arms E' E', and adjustable nuts $F^2$ $F^2$ also being located upon the extreme ends of the rods, so as to assist in keeping said arms in place. These arms terminate at their upper ends in screw-threaded sleeves G' G', which receive the lower screw-threaded ends of bolts H' H', the upper ends of the latter passing into the lower portion of a double boxing or socketed coupling I'. The upper portions of these sockets receive the ends of arms or bolts J' J'.

In order to retain both bolts H' and J' in place within the socket, I provide the ends of the same with transverse pins K' K', which bear against suitable washers L' L'. The upper ends of arms or bolts J' J' terminate in eyes $j$ $j$, through which the transverse axle W passes. It will be observed that all of these parts last mentioned—that is, the several arms which connect the ends of the forward transverse bar with the ends of the forward axle W—when arranged as just described extend at an incline or obliquely.

The letters M' M' indicate brace rods or bars having formed in their lower ends eyes, through which the transverse bar D' passes. These lower ends are prevented from lateral dislodgment by being interposed between the outer sides of the eyes of the standards C' C' and adjustable nuts N' N', located upon the rod. The upper ends of the brace-bars are formed with elongated slots $m'$ $m'$, through which set-screws O' O' pass, said screws also passing into the sides of the double-socketed couplings. This construction permits of the braces being readily adjusted.

Secured between two adjustable nuts P' P' upon the transverse rod D' is the lower end of an arm Q'. This arm is provided at or near its center with an elongated slot $q$ and upon its under side for a greater portion of its length with a recess $q'$.

Centrally mounted upon axle W is the upper end of an arm R', said arm having its lower end reduced and provided upon its upper surface with a central ridge $r$, which is adapted to fit into the recess of arm Q'. A transverse bolt $S^2$ passes through the upper portion of this latter arm, and has mounted upon opposite ends thereof bell-crank levers T' T'. The forward members or portions of the bell-crank levers are provided with series of perforations $u'$ $u'$, while their rear members or arms are slightly beveled or rounded.

Immediately above the rear piece $b'$ of the forward frame is located a transverse bar or plate V'. Adjustably connected to the center of this bar or plate is a longitudinal bar or plate W', said adjustability being attained by means of a set-screw X', passing through an elongated slot $w$ of the longitudinal bar or plate and into the transverse plate V'. This longitudinal plate or bar is fulcrumed at or near its center upon a block Y', secured to the central longitudinal strip $b^2$ of the forward frame. The forward end of the longitudinal bar or plate W' is provided with an upwardly-extending slotted lug $w'$. This slotted lug receives the forward end of an arm Z', said arm being fulcrumed upon a vertical bolt $A^2$, which passes through the same and also into the arm Q' above it.

The arm Z', it will be noticed, is formed or provided upon its rear with a transverse extension $B^2$, said extension being provided with a series of perforations $b^3$, which receive the downwardly-bent ends of rods $C^2 C^2$, said rods having their upper ends passing into screw-threaded sockets or sleeves $D^2 D^2$. The upper ends of the latter receive the lower ends of bolts $E^2 E^2$, the upper ends of said bolts being formed integral with bifurcated brackets $F^3 F^3$. These brackets are designed to receive the forward members or arms of the bell-crank levers, and are provided with transverse perforations, which are made to register with any of the series of perforations of the bell-cranks, transverse pins $G^2 G^2$ serving to connect the parts. It is obvious that by providing the bell-crank levers with a plurality of perforations the bifurcated brackets may be readily adjusted relative thereto.

The letters $H^2 H^2$ indicate arms provided with central eyes, through which the forward axle passes. These arms are so located upon the axle as to bear against the sides of the eye of arm R', which is centrally journaled thereon. Each of these arms have their opposite ends bifurcated to receive anti-friction rollers $I^2 I^2$, which are adapted to bear against the rounded or beveled surfaces of the inner members of the bell-cranks. In order that these arms may act alternately, they are arranged upon the axle W at different inclinations or obliquities. Set-screws $J^2 J^2$ also pass vertically through the eyes of these arms and bear against the axle, whereby this inclination or obliquity may always be regulated.

The letters $K^2 K^2$ indicate the plows or furrow-openers secured at their forward ends to the side pieces $b b$ of the front frame. These plows or cutters are of the usual and well-known form, and are provided with laterally-extending knives $L^2 L^2$, which serve the function of severing weeds, &c., which may be in the line of the furrow. Furthermore, they are provided with lateral plates $L^3 L^3$, which serve to regulate the depth of the incision.

The letters $M^2 M^2$ indicate the concaved plow standards or conductors provided upon their rear sides with concaved portions forming the seed-chutes $m^2 m^2$. As these standards, seed-slides, seed-hoppers, and mechanism in connection therewith are exactly similar upon both sides of the machine, the description which follows, for the sake of convenience, will be in the singular number. In this chute is located a lug $m^3$. A partly rotatable or oscillating arm $N^2$ is also located within the chute, said arm being doubly grooved and provided upon its lower end with a pin or pintle $n'$, which is adapted to enter a perforation in the lug, and provided upon its upper end with a crank $n^2$.

The upper end of the concaved plow-standard terminates in a horizontal plate $m^4$, from which depend flanges $m^5 m^5$, adapted to bear against the rear beam or strip $b'$ of the forward frame, and to be secured thereto by means of screws or equivalents. Secured to this upper plate $m^4$ is a bearing-plate $O^2$, provided with a seed-perforation $o$, and also with a recess $o'$, which receives a vertical pin $n^3$, extending from the upper end of the partly-rotatable doubly-grooved arm $N^2$. As this arm is partly rotated in the manner hereinafter to be explained, the recesses therein alternately register with the seed-perforation of the bearing-plate, the lug at the bottom of the rotatable arm confining the seed within the recess unless said recess is changed by the rotation of the arm so as to be thrown out of alignment with the lug.

The letter $P^2$ indicates the bottom of the seed-hopper provided upon its under side with perforated lugs $p p p$, which bear upon the upper plate of the plow-standard and receive screws passing through said upper plate, thereby locking the standard securely in place. The forward and rear side edges of this bottom piece of the hopper are provided with lugs $p' p'$, while the upper surface is provided with four projecting corner-lugs $p^2$, which are adapted to fit in the angles of the seed-hopper $O^2$, and also provided with a front rectangular depression or recess $p^3$ and a rear transverse depression $p^4$, extending the entire width of the bottom piece. The under side is also cut away, as indicated at $p^5$, the downwardly-extending side of said undercut portion being provided with two small notches $p^6 p^6$, which receive the crank $n^2$ at the upper end of the doubly-recessed arm $N^2$ when the same is turned to either of its side limits.

In the rear transverse depression fits the longer arm of a U-shaped seed-slide $R^2$, said longer arm being provided with seed-perforations $r r$, which when said slide is actuated will alternately register with the seed-perfotion in the bearing-plate $O^2$ and with one of the grooves in the arm $N^2$. The longer arm of this slide is also connected to one end of the horizontal plate or bar V', so that when the latter is actuated laterally by means of the mechanism previously stated a similar actuation will be given to the seed-slide. It will be noticed that the shorter arm of this slide is pressed downward slightly, so as to cause it to occupy a plane below that of the longer arm, and also to permit the same to fit in the undercut portion $p^5$ of the seed-hopper bottom. The inner edge of this short arm is also provided with a notch $r'$, which receives the crank $n^2$ upon the upper end of the doubly-grooved arm $N^2$.

In order to prevent dirt from getting into the chute and clogging the same, I provide a guard $S^3$, the vertical portion of which corresponding to the shape of the chute and the horizontal portion extending across the bottom of the hopper. The ends of this horizontal portion are also provided with perforations $s\ s$, which register with the perforations in the lugs $p'\ p'$, said registering perforations adapted to receive the lower screw-threaded ends of vertical rods $T^2\ T^2$, the upper ends of the latter passing through screw-threaded apertures in lugs $u\ u$, extending from a rectangular top frame $U^3$ of the hopper. In this manner the hopper and frame are securely held together.

The upper end of the screw which passes through the forward lug $p$ upon the end of the hopper-bottom has secured thereto the forward end of a guide-plate $V^2$, the rear end of said plate being bent upwardly, so as to overlap the long arm of the seed-slide and to keep the same in proper position within its transverse recess.

Figures 2, 8:
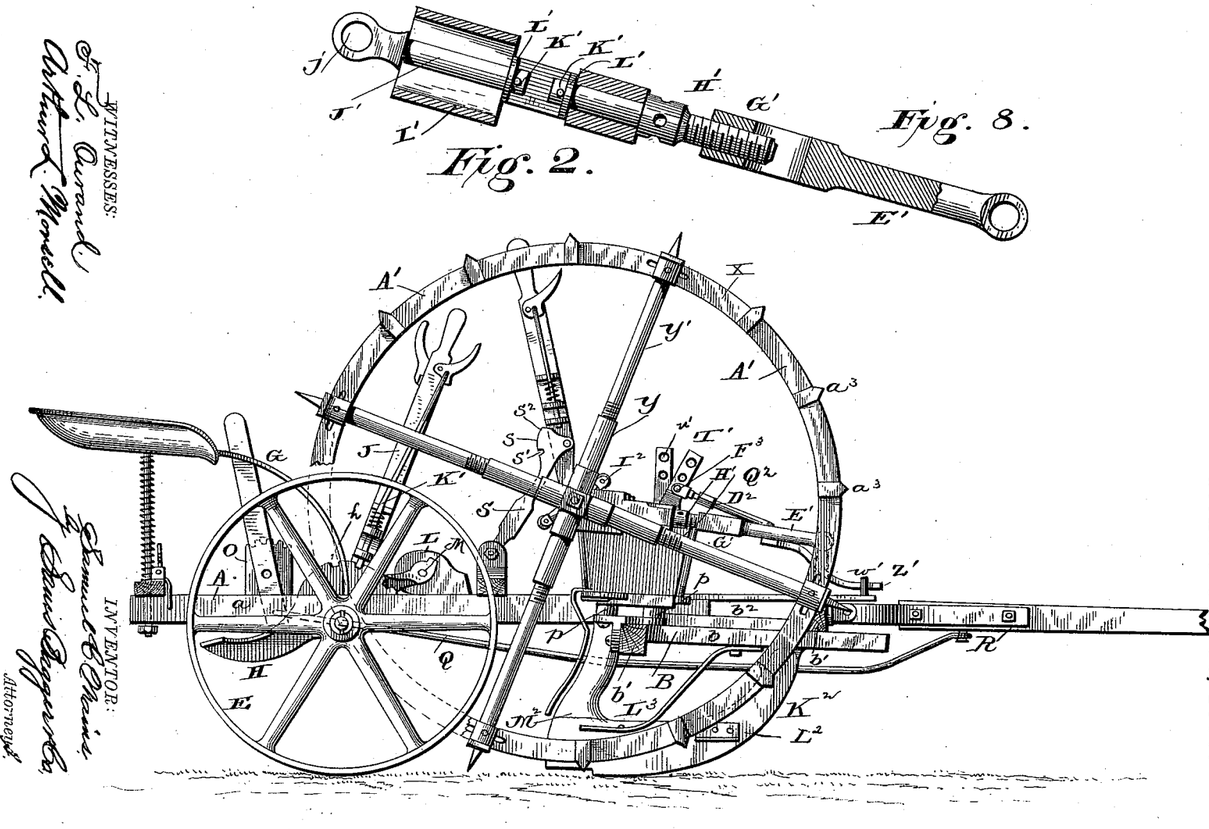
Fig. 2 is a side elevation showing the front axle lowered.
Fig. 8 is a longitudinal section on the line $z'z'$, Fig. 1.
Figure 3:
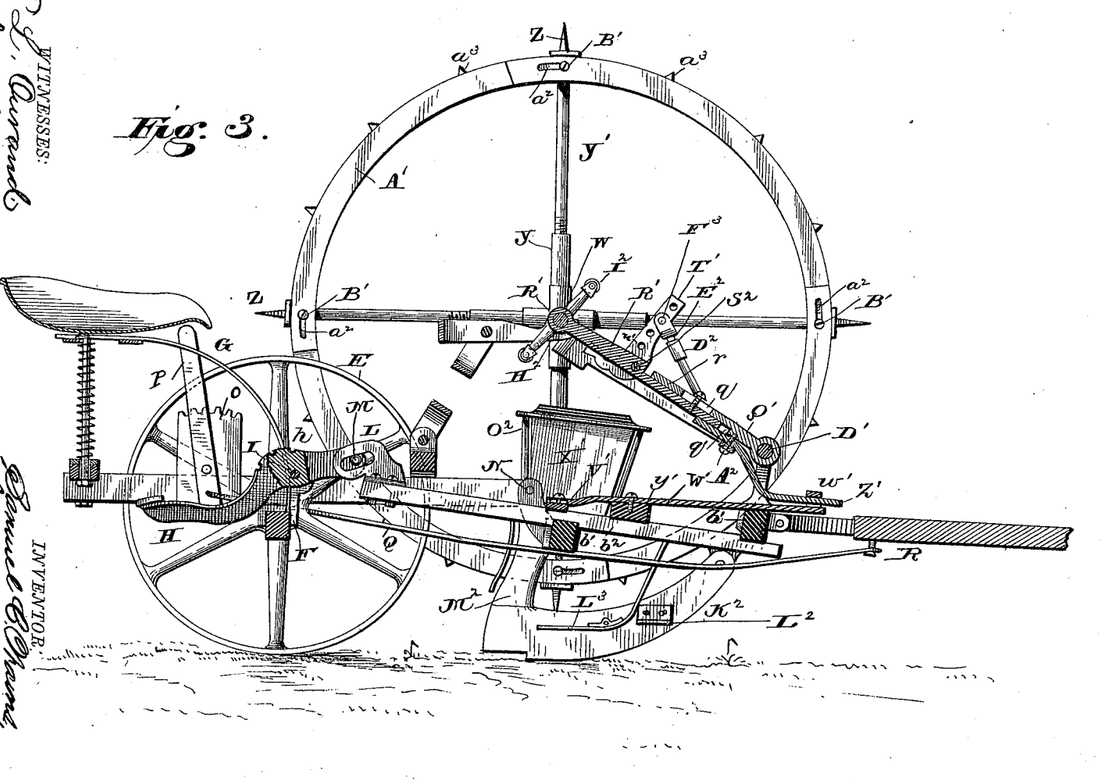
Fig. 3 is a longitudinal vertical section through the center of Fig. 1.
Figure 4:
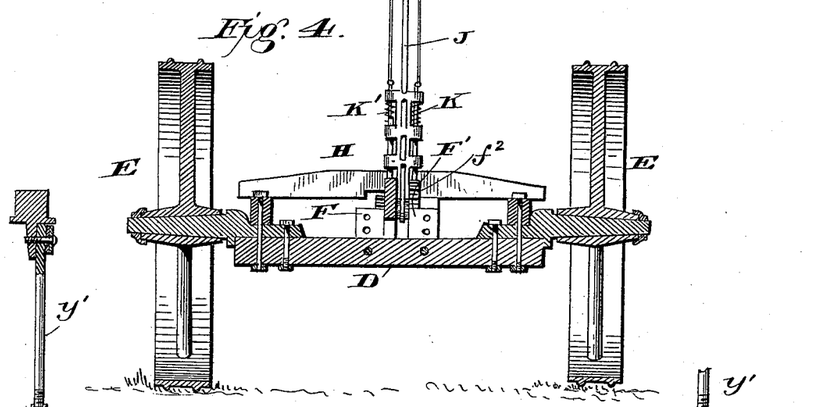
Fig. 4 is a transverse section on the line $xx$, Fig. 1.
Figure 5:
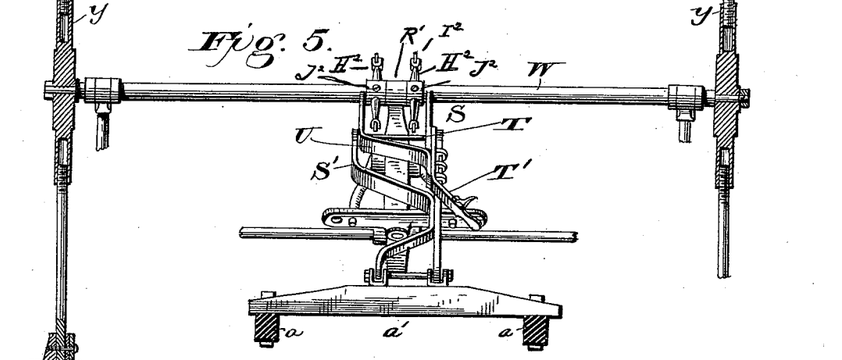
Fig. 5 is a transverse section on the line $yy$, same figure.
Figures 6, 7, 11, 11A, 17:
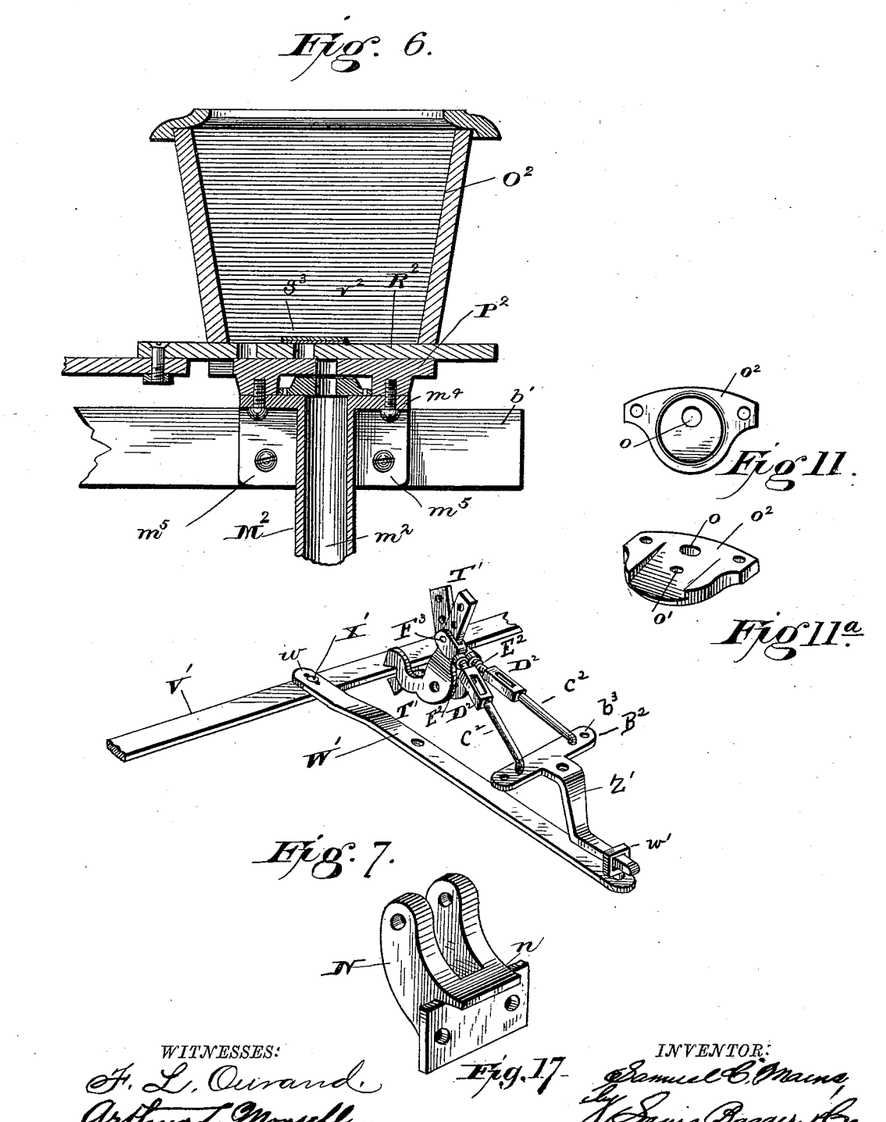
Figures 9, 10, 12, 13, 14, 16:
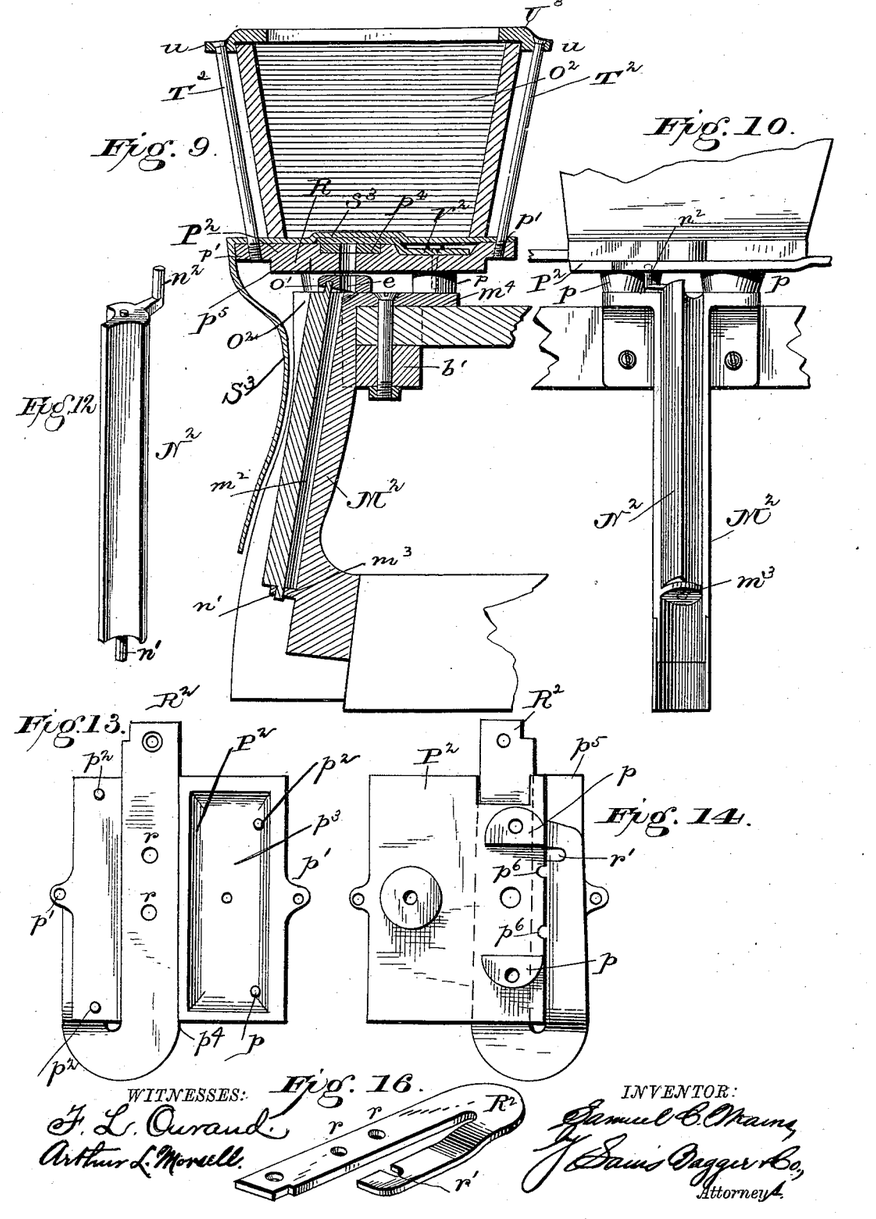
Fig. 9 is a longitudinal section through the seed box or hopper.
Fig. 10 is a rear elevation of the chute, the hood or guard therefor being removed.
Fig. 12 is a detail view of the partly-rotatable doubly-grooved arm within the chute.
Fig. 13 is a plan of the bottom of the seed-hopper.
Fig. 14 is an inverted plan of the same.
Fig. 16 is a detail view of the slide.
Figure 15:
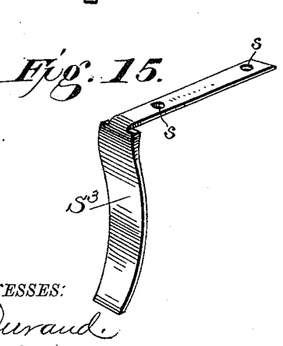
Fig. 15 is a detail view in perspective of the guard or cover for the chute.
Figure 18:
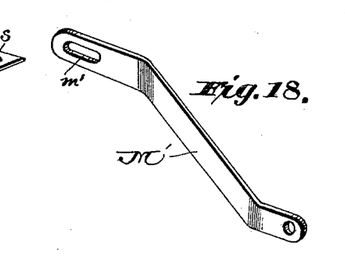
Fig. 18 is also a detail.

Having thus described the construction of my invention, the operation of the same is as follows: In the first place the height of the forward frame of the planter is regulated by means of the foot-lever H, and after the frame is properly adjusted so as to have the plows bear firmly in the ground or lightly, as the case may be, according to the nature of the soil, the frame may be locked in its position by means of the rear double spring-actuated-pawl mechanism. The forward toothed wheels are now lowered, as indicated in Fig. 2, so as to engage the ground, this being accomplished by simply throwing the frame U out of engagement with the forward axle W. The planter is now in operative position. As it traverses the ground the teeth of the wheels X X enter the soil, which causes the shaft W to rotate. The rotation of this shaft of course causes the arms $H^2\ H^2$ also to rotate, said arms being rigidly fixed to the shaft. As these latter rotate the anti-friction rollers thereof come in contact alternately with the rounded or beveled ends of the inner members of the bell-cranks, which are thus made to alternately turn upon their pivot, and through the medium of the connecting-arms the rear transverse bar or plate $V'$ is given a lateral movement, which in turn imparts a similar movement to the seed-slides, to which its ends are connected. As these seed-slides are thus actuated the seed-perforations therein are made to register at the proper time with the seed-perforations beneath the same, so that the grain at proper intervals has a free passage to the chute. It will also be apparent that the actuation of the seed-slide, as just explained, will have the effect of turning the doubly-grooved arm $N^2$ so as to cause the grooves to alternately register with the registering seed-perforations, whereby the seed, as previously explained, is confined within the groove and then subsequently discharged therefrom into the furrow.

Figure 1:
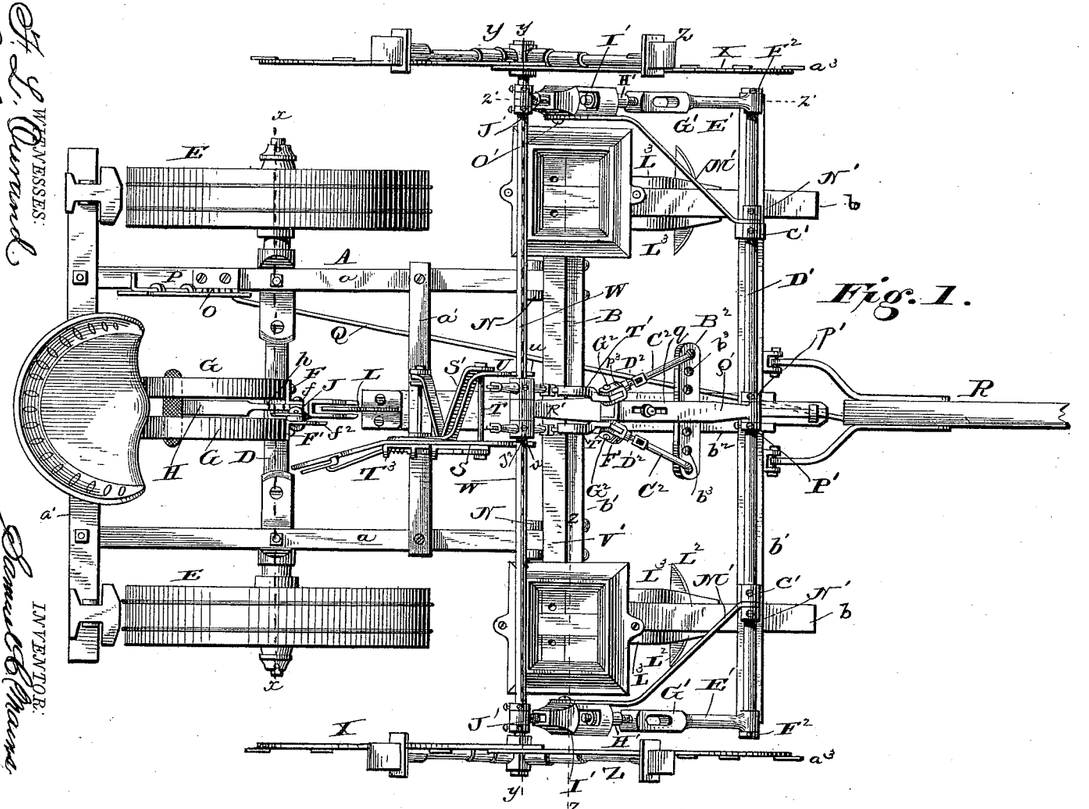
Figure 1 is a plan view of the complete device, indicating the axle in its raised position.

It will be noticed that the working parts of my invention—that is, the mechanism arranged upon the forward frame of the device—are connected thereto in such a manner as to be capable of ready removal, so that when it is desired to adjust said mechanism to the frames of different corn-planters this may be readily accomplished. Furthermore, almost the entire device is made adjustable, so that when transferred to an ordinary corn-planter frame it may be regulated so as not only to fit accurately, but also work perfectly. The forward wheels, also, as previously described, may be either increased in circumference or decreased to suit the frame to which they are applied, and when thus either increased or decreased the spokes may be lengthened or shortened, as occasion may require. When the end of a row has been reached and it is desired to turn the machine, or after the planting has been completed and it is desired that the forward toothed wheels should not operate, all that is necessary to be done is simply to elevate the same by throwing the frame U into engagement with the axle W, as indicated by dotted lines in Fig. 1.

Having thus described my invention, what I claim, and desire to secure by Letters Patent of the United States, is—

1. In a corn-planter, the combination, with a wheel having its periphery consisting of a series of sections, each section having one end provided with an elongated slot and provided upon their edges with pins or teeth, of spokes consisting of two sections, the inner sections being tubular and screw-threaded and the outer sections having their inner ends screw-threaded and passing into the tubular threaded portions of the inner sections, marking-points located upon the ends of the spokes, and set-screws passing through the elongated slots of the peripheral sections, through the ends of the contiguous sections, and into the spokes adjacent, substantially as set forth.

2. In a corn-planter, the combination of a movable axle carrying suitable toothed wheels, arms pivotally secured to the frame, one of said arms being straight and terminating at its upper end in a notched and shouldered quadrant and the other arm having two oblique members and a central horizontal portion, the latter secured to the adjacent straight arm, a U-shaped frame pivoted between the forward ends of these arms and having end notches to engage the movable axle, and a spring-actuated-pawl mechanism for engaging the notched and shouldered quadrant of the straight arm, substantially as set forth.

3. In a combined corn-planter and check-rower, the combination of a forward axle carrying suitable toothed wheels, a forward transverse rod, end connections between said rod and the axle, an arm connecting the axle with the forward rod, arms fixedly secured to the axle, said arms carrying in opposite ends anti-friction rollers, a transverse shaft or bolt passing through the connecting-arm, bell-crank levers mounted upon said shaft or bolt, the rear members of said levers adapted to be engaged alternately by the anti-friction rollers of the arms as the latter are rotated with the axle, arms connected to the forward members of the bell-crank levers, a T-shaped arm pivoted to the under side of the connecting-arm, the transverse portion of said T-shaped arm having connection with the lower ends of the arms to which the forward members of the bell-cranks are attached, a longitudinal plate suitably fulcrumed to the frame of the machine and provided at its forward end with an upwardly-extending slotted lug which receives the forward end of the T-shaped arm, and a transverse plate to which the rear end of the longitudinal plate is pivotally secured, said transverse plate adapted to be connected to the seed-slides and impart its lateral movement thereto, substantially as set forth.

4. In a corn-planter, the combination of a forward axle carrying suitably-toothed wheels, a forward transverse rod, arms removably secured to the ends of said forward rod, said arms terminating at their upper ends in screw-threaded sleeves, bolts having their lower screw-threaded ends engaging said sleeve, double socketed connections or couplings into which the upper ends of the bolts pass, transverse pins and washers upon the upper ends of said bolts to retain the same in position, arms each secured between nuts upon the axle, having their ends passing into the upper portions of the doubled socketed couplings and secured therein by means of transverse pins and washers, an arm having its upper end provided with an eye through which the axle passes loosely, said arm having its lower end reduced and provided with a central ridge, adjustable arms secured upon the axle upon each side of the arm intermediate and carrying anti-friction rollers, a transverse shaft or bolt passing through the enlarged portion of said intermediate arm, bell-crank levers mounted upon the ends of said shaft, the rear members of said levers having their ends slightly rounded or beveled and adapted to be engaged by the anti-friction rollers and the forward members provided with a series of perforations, an arm having its under side recessed and adapted to receive the central ridge of the arm extending from the axle and also provided upon its upper surface with an elongated slot, a set-screw working in said slot, a T-shaped arm pivotally secured to the forward portion of the last-named arm, arms secured to the transverse portion of the T-shaped arm, said arms terminating at their upper ends in screw-threaded sleeves, arms having their lower ends screw-threaded and passing into these sleeves and having their upper ends bifurcated, the latter adapted to be secured to the forward members of the bell-crank levers by a transverse pin passing through the same and through any of the series of perforations in said levers, a fulcrumed longitudinal plate provided at its forward end with an upwardly-extending slotted lug adapted to receive the forward end of the T-shaped arm, having its rear end provided with an elongated slot, a transverse plate centrally pivoted to the longitudinal plate by a pin passing through the elongated slot of the latter, and brace-bars having their ends removably secured to the transverse forward bar and their rear ends provided with elongated slots to receive set-screws which pass into the double socketed connections or couplings, substantially as set forth.

5. In a corn-planter, the combination of plow-standards having their rear edges concaved to form seed-chutes, a seed-hopper having its bottom upon its upper side recessed transversely and upon its under side an undercut portion, a U-shaped seed-slide having the longer arm thereof provided with seed-perforations, said longer arm fitting in the transverse recess of the hopper-bottom and the shorter arm bent so as to fit into the undercut portion of said hopper-bottom, a partly-rotatable doubly-grooved arm within the chute formed in the plow-standard, said arm being connected with the shorter arm of the slide and adapted to be turned thereby as the slide is actuated, so that the corresponding grooves thereof may be made to alternately register with the seed-perforations, and means for actuating the seed-slide, substantially as set forth.

6. In a corn-planter, the combination of a plow-standard having its rear edge concaved to form a seed-chute, a seed-hopper having its bottom recessed upon its upper side and having upon its under side an undercut portion, a U-shaped seed-slide having the longer arm thereof provided with seed-perforations, said longer arm fitting in the transverse recess of the hopper-bottom and the shorter arm bent so as to fit into the undercut portion of the seed-hopper bottom, a plate interposed between the bottom of the hopper and the upper portion of the standard, said plate provided with a seed-perforation adapted to register with the perforations in the long arm of the slide, a partly-rotatable doubly-grooved arm within the chute, said arm being connected with the shorter arm of the slide and adapted to be turned thereby as the slide is actuated, so that the corresponding grooves thereof may be made to alternately register with the registering seed-perforation, and means for actuating the seed-slide, substantially as set forth.

7. In a corn-planter, the combination, with a plow-standard having its upper end formed into a plate, with depending flanges forming means for attachment of the plow-frame, and having its rear edge concaved to form a seed-chute, of a perforated lug projecting from said chute, a partly-rotatable doubly-grooved arm within the chute, having its opposite ends provided with pins or pintles, the pin in the lower end engaging the perforated lug, a seed-hopper having its bottom upon its upper edge recessed transversely and having upon its under side an undercut portion, the downwardly-extending side piece of said undercut portion provided with notches to accommodate the crank upon the doubly-grooved arm, and also depending perforated lugs to receive screws passing through the top plate of the plow-standard, a U-shaped seed-slide having the longer arm thereof provided with seed-perforations, said longer arm fitting in the transverse recess of the hopper-bottom and the shorter arm bent so as to fit in the undercut portion of said hopper-bottom, said short arm being slotted to receive the crank of the doubly-grooved arm, a plate interposed between the bottom of the hopper and the upper plate of the standard, said interposed plate provided with a seed-perforation adapted to register with the perforations in the longer arm of the slide, and also provided with a perforation to receive the pintle in the upper end of the partly-rotatable doubly-grooved arm, and means for actuating the seed-slide, substantially as set forth.

8. In a corn-planter, the combination, with the seed-hopper provided upon its bottom with a forward rectangular recess and a rear transverse recess, of a seed-slide working in the latter recess, and a guide-plate having one end secured to the forward rectangular recess and its free end overlapping the slide, substantially as set forth.

9. In a corn-planter, the combination, with a standard having its rear edge concaved, so as to form a seed-chute, of a guard or protector secured thereto for preventing dirt from clogging the same, substantially as set forth.

10. In a corn-planter, the combination, with a plow-standard having its rear edge concaved to form a seed-chute, of a seed-hopper having its bottom provided with a forwardly and also a rearwardly extending perforated lug, a seed-slide, said slide working within a suitable recess in the hopper-bottom, a guard or shield consisting of a vertical and a horizontal portion, the vertical portion conforming to the shape of the rear of the plow-standard and the horizontal portion extending across the bottom of the hopper and provided with perforations registering with the perforations in the lugs of said bottom, a top rectangular frame for the hopper, provided with perforated lugs, and bolts passing through said lugs and through the registering perforations of the horizontal portion of the guard and lugs of the bottom of the seed-hopper, substantially as set forth.

In testimony that I claim the foregoing as my own I have hereunto affixed my signature in presence of two witnesses.

SAMUEL C. MAINS.

Witnesses:
 JAMES MAINS,
 JAMES G. BERRY.